United States Patent
Hwang et al.

(10) Patent No.: US 8,126,067 B2
(45) Date of Patent: Feb. 28, 2012

(54) APPARATUS AND METHOD FOR ESTIMATING CHANNEL IN COMMUNICATION SYSTEM SUPPORTING OFDM/OFDMA

(75) Inventors: Yong-suk Hwang, Yongin-si (KR); Jae-hyeong Kim, Seoul (KR)

(73) Assignee: Seah Networks Co., Ltd., Seoul (KR)

( * ) Notice: Subject to any disclaimer, the term of this patent is extended or adjusted under 35 U.S.C. 154(b) by 877 days.

(21) Appl. No.: 12/158,547

(22) PCT Filed: Dec. 29, 2006

(86) PCT No.: PCT/KR2006/005900
§ 371 (c)(1), (2), (4) Date: Jun. 20, 2008

(87) PCT Pub. No.: WO2007/075073
PCT Pub. Date: Jul. 5, 2007

(65) Prior Publication Data
US 2008/0304591 A1    Dec. 11, 2008

(30) Foreign Application Priority Data
Dec. 29, 2005   (KR) .................. 10-2005-0133265

(51) Int. Cl.
*H04L 27/28* (2006.01)
(52) U.S. Cl. .................. 375/260; 375/316
(58) Field of Classification Search .......... 375/316, 375/260, 130
See application file for complete search history.

(56) References Cited

U.S. PATENT DOCUMENTS
2004/0161047 A1 * 8/2004 Liu et al. .................. 375/260

OTHER PUBLICATIONS

Korean Intellectual Property Office, International Search Report for International Application No. PCT/KR2006/005900, 2 pages (Date completed: Mar. 16, 2007).
Nikitopoulos et al., "Compensation Schemes for Phase Noise and Residual Frequency Offset in OFDM Systems", pp. 330-333, *IEEE* (2001).
Yuanjin, "A Novel Channel Estimation and Tracking Method for Wireless OFDM Systems Based on Pilots and Kalman Filtering", pp. 275-283, *IEEE* (2003).

\* cited by examiner

*Primary Examiner* — Emmanuel Bayard

(57) ABSTRACT

Disclosed are an apparatus and a method for estimating a channel in a base station when using a Partial Usage of Sub-Channels (PUSC) mode in an uplink channel of the communication system supporting Orthogonal Frequency Division Multiplexing/Orthogonal Frequency Division Multiple Access (OFDM/OFDMA). For this, the channel estimation apparatus used in the communication system supporting the OFDM/OFDMA comprises a phase estimation/compensation unit estimating and compensating phase change of a channel by using pilots included in signals input by sub-channel; and a channel estimation unit estimating the channel by averaging the pilots of the signals of which the phase is compensated.

16 Claims, 4 Drawing Sheets

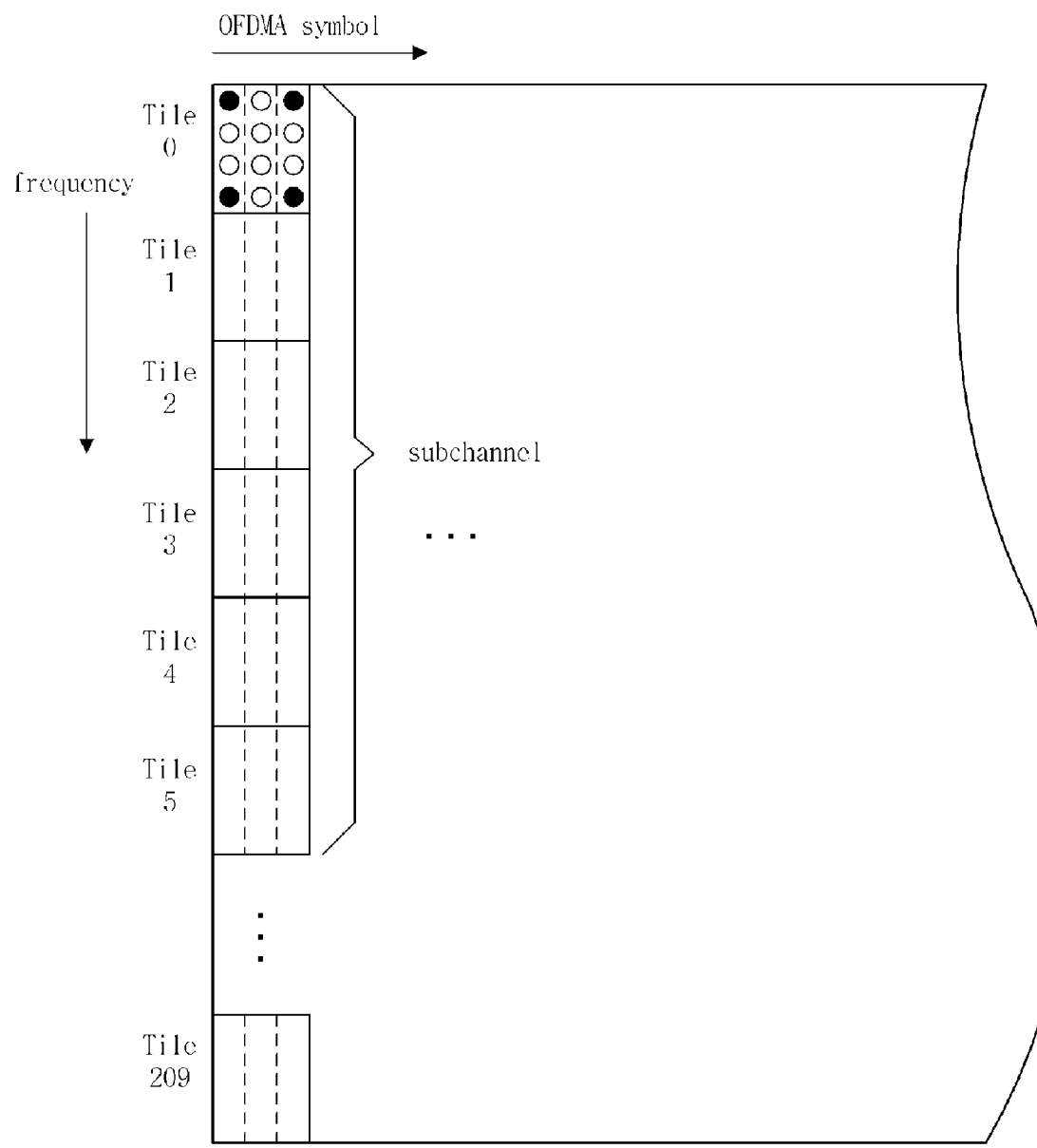

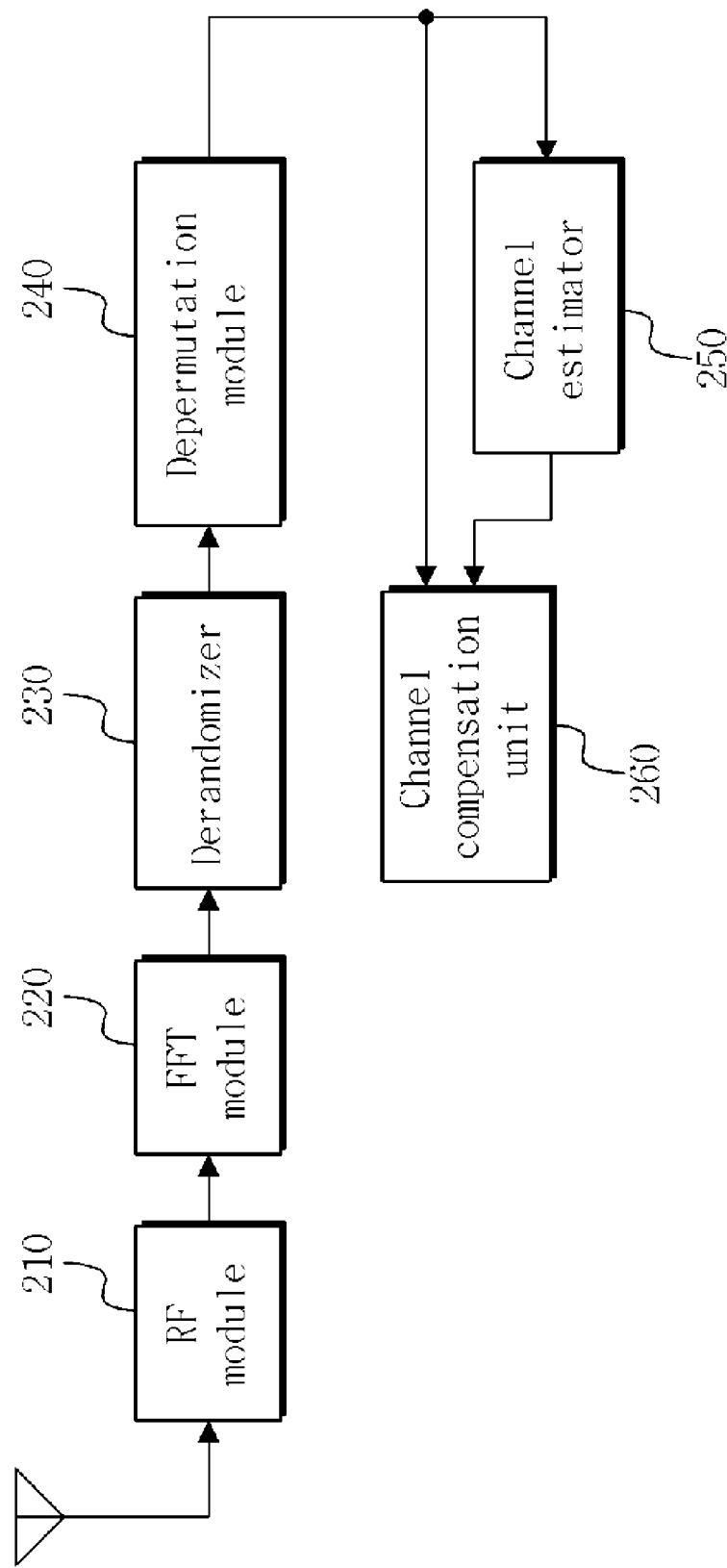
[Fig. 2]

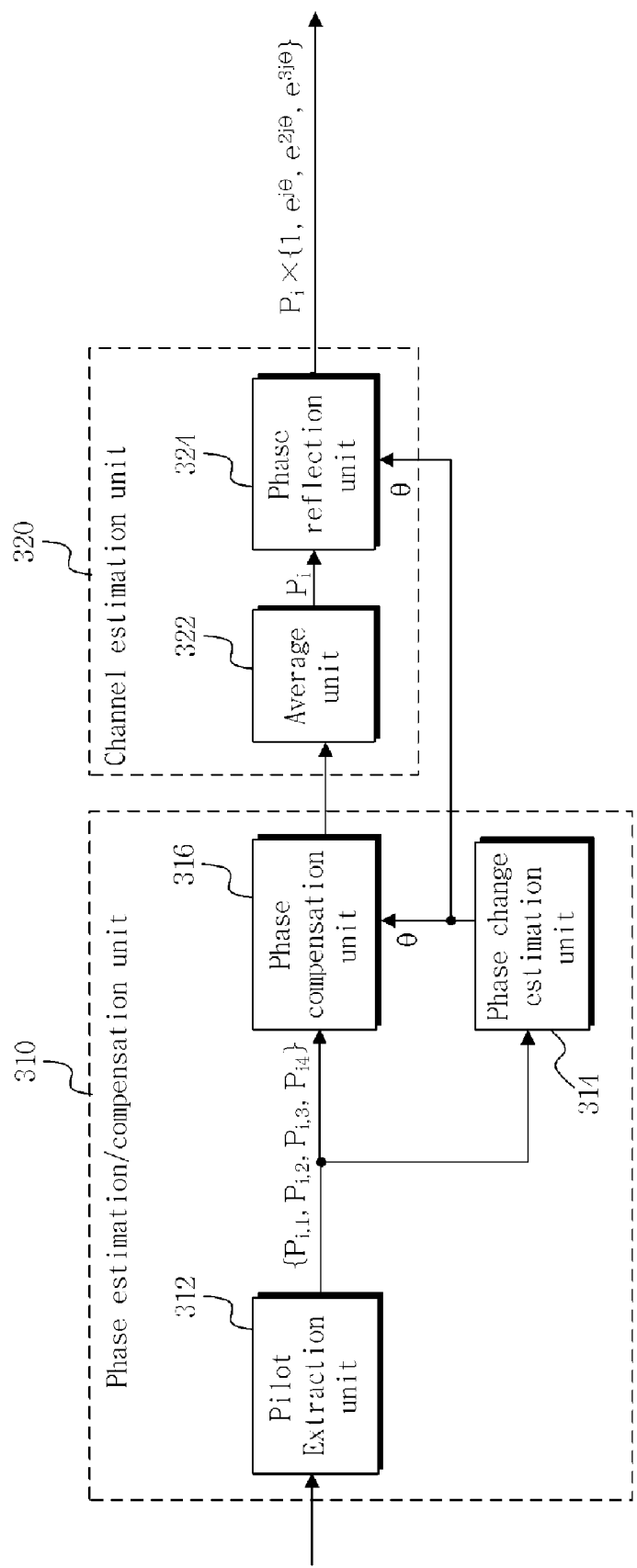
[Fig. 3]

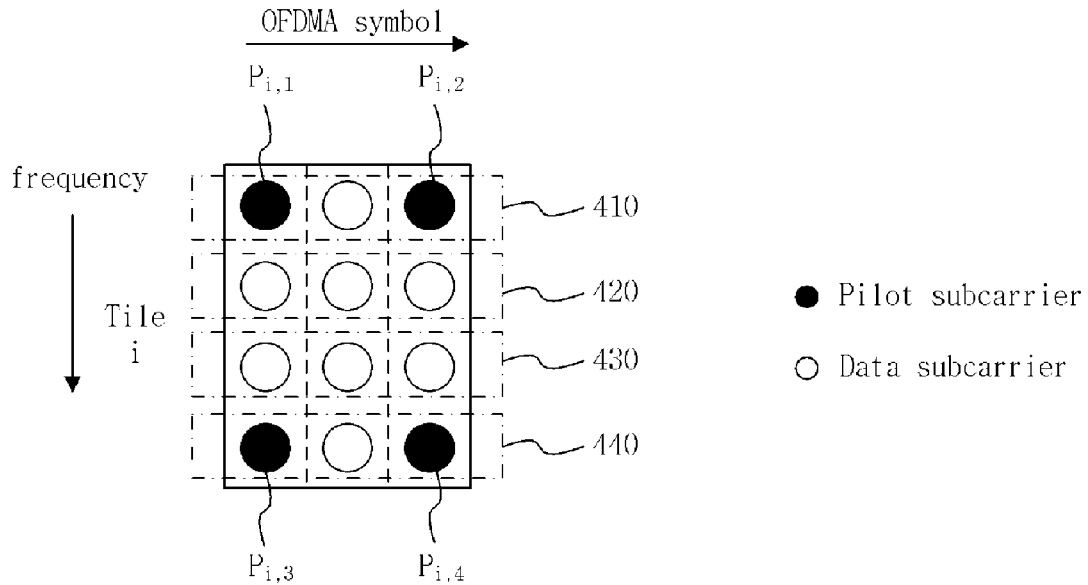
[Fig. 4]
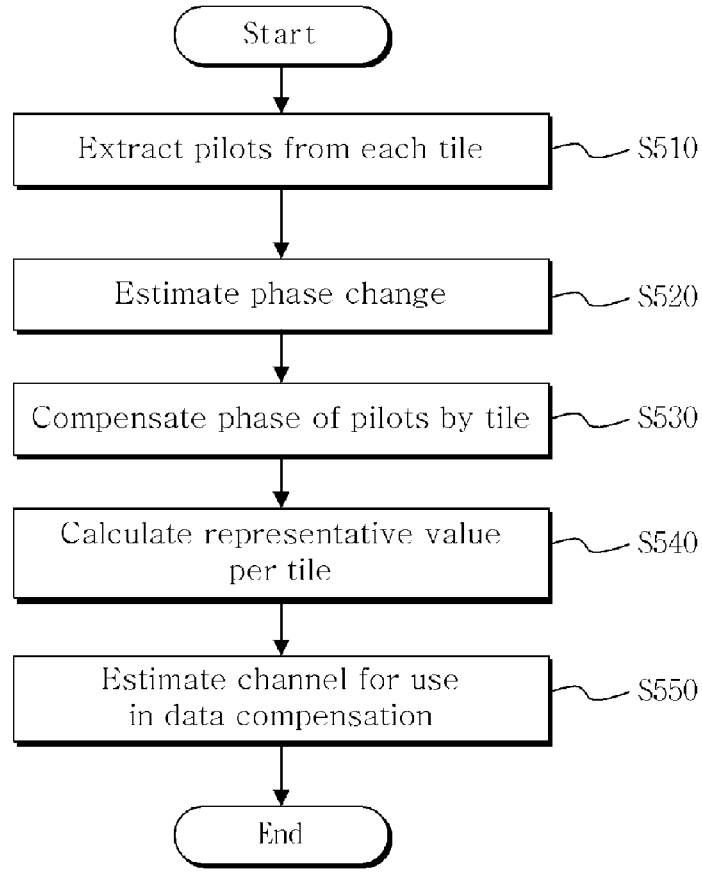
[Fig. 5]

APPARATUS AND METHOD FOR ESTIMATING CHANNEL IN COMMUNICATION SYSTEM SUPPORTING OFDM/OFDMA

CROSS REFERENCE TO RELATED APPLICATIONS

This application is a US National Stage of International Patent Application No. PCT/KR2006/005900, filed Dec. 29, 2006, which in turn claims the benefit of Korean Patent Application No. 10-2005-0133265, filed Dec. 29, 2005, the disclosures of both applications are incorporated herein by reference.

TECHNICAL FIELD

The present invention relates to an apparatus and a method for estimating a channel in a communication system supporting Orthogonal Frequency Division Multiplexing (OFDM)/Orthogonal Frequency Division Multiple Access (OFDMA). More particularly, the present invention relates to an apparatus and a method for estimating a channel in a base station when a PUSC (Partial Usage of Sub-Channels) mode is applied in an uplink channel of a communication system supporting the OFDM/OFDMA.

BACKGROUND ART

Recently, researches have been in progress to offer users services with a variety of service qualities, capable of transmitting high-capacity data at high speed. Especially, the researches are focusing on supporting a Broadband Wireless Access (BWA) communication system such as a Wireless Local-Area Network (WLAN) system and a Wireless Metropolitan-Area Network (WMAN) system, with high-speed service guaranteeing mobility and quality. Typical examples of the communication system include Institute of Electrical and Electronics Engineers (IEEE) 802.16a and IEEE 802.16e.

The IEEE 802.16a and the IEEE 802.16e apply Orthogonal Frequency Division Multiplexing (OFDM)/Orthogonal Frequency Division Multiple Access (OFDMA) to support a physical channel of the WMAN system with a broadband transmission network. More particularly, the IEEE 802.16a considers only a single cell structure in a state where a current Subscriber Station (hereinafter, referred to as SS) is fixed. In other words, the IEEE 802.16a does not consider mobility of the SS at all. On the other hand, the IEEE 802.16e considers mobility of the SS. The SS having mobility is referred to as a Mobile Subscriber Station (hereinafter, referred to as MSS).

Similarly, a Wireless Broadband Internet (WiBro), which is Korean standard of the wireless portable Internet, applies the OFDM for a signal transmission to enable high-speed data service in a state where the user is moving in the wireless environment. Additionally, the OFDMA based on the OFDM is applied to enable the Internet service to be offered to a plurality of users simultaneously.

In the communication system supporting the OFDM/OFDMA, change of a channel in a frequency domain may be caused by the followings. For example, a phase change of the channel transmitting signals in a frequency domain may differ depending on a position of performing Fast Fourier Transform (FFT) with a received signal in a receiver. A change of channel in the frequency domain may differ depending on a difference in time delay among the received multipath channels in a time domain.

In the communication system in which the channel is changed as described above, channel estimation is performed to cope with the change of channel. For the channel estimation, the transmitter inserts pilots in the frequency domain when performing transmission.

The receiver performs the channel estimation for compensating distortion on data between the pilots, using the pilots being transmitted. To be more specific, the channel can be estimated by averaging the pilots or by multiplying each pilot by a weight according to the position of the data and summing the multiplied values.

For example, when the pilots are relatively similar to one another in the frequency domain, noise can be reduced by the channel estimation method of the averaging the pilots. Actually, however, since the pilots are respectively different, an error in the channel estimation may be generated, when averaging the pilots.

The channel estimation method of multiplying each pilot by a weight and summing the multiplied values compensates the difference of channel by giving a greater weight to a nearer pilot. Here, when applying the same weight to all the pilots, the channel is estimated in the same manner as the method of the averaging the pilots. If different weights are given according to the pilots, adaptability for the change of channels can be improved whereas noise reduction efficiency is deteriorated.

Consequently, a channel estimation method which is not subject to the channel difference and the noise has been required.

DISCLOSURE OF INVENTION

Technical Problem

Therefore, the present invention has been made in view of the above-mentioned problems, and it is an object of the present invention to provide an apparatus and a method for estimating a channel in a communication system supporting Orthogonal Frequency Division Multiplexing (OFDM)/Orthogonal Frequency Division Multiple Access (OFDMA) that uses a Partial Usage of Sub-Channels (PUSC) mode in an uplink channel.

It is another object of the present invention to provide an apparatus and a method for estimating a channel by estimating and compensating the change of phase using pilots, in a communication system supporting OFDM/OFDMA that uses the PUSC mode in an uplink channel.

Technical Solution

According to an aspect of the present invention, there is provided an apparatus for estimating a channel in a communication system supporting Orthogonal Frequency Division Multiplexing/Orthogonal Frequency Division Multiple Access (OFDM/OFDMA), the apparatus comprising a phase estimation/compensation unit for estimating and compensating phase change of a channel by using pilots included in a signal input by the sub-channel; and a channel estimation unit for estimating the channel by using the pilots of the signal of which the phase is compensated.

The phase estimation/compensation unit comprises a pilot extraction unit for extracting the pilots from each tile constituting the sub-channel in the signal input by the sub-channel; a phase change estimation unit for estimating the phase change by the sub-channel by using the extracted pilots; and a phase compensation unit for compensating the phase of the extracted pilots by using the estimated phase change.

The channel estimation unit comprises an averaging unit for calculating representative values of the respective tiles by summing the phase-compensated pilots by the tile and averaging the sum; and a phase reflection unit for estimating the channel for data compensation by using the representative values of the respective tiles and the phase change.

According to another aspect of the present invention, there is provided a method for estimating a channel in a communication system supporting OFDM/OFDMA, comprising steps of estimating and compensating phase change of the channel by using pilots included in a signal input by sub-channel; and estimating the channel by using the pilots of the signal of which the phase change is compensated.

The estimating and compensating step comprises steps of extracting the pilots from each tile constituting the sub-channel in the signal input by the sub-channel; estimating the phase change by the sub-channel by using the extracted pilots; and compensating the phase of the extracted pilots by using the phase change.

The channel estimating step comprises calculating representative values of the respective tiles by summing the phase-compensated pilots by the tile and averaging the sum; and estimating the channel for data compensation by using the representative values of the respective tiles and the phase change.

ADVANTAGEOUS EFFECTS

According to the present invention, phase change existing in a signal received by a receiver is removed by compensating the change of phase estimated by a phase change estimation unit 314, in the phase compensation unit. As a result, an accurate value can be obtained when averaging pilots in an averaging unit.

Also, more accurate estimation of the phase change can be achieved by estimating the phase change by the sub-channel in the phase change estimation unit. Furthermore, influence of noise can be reduced in estimating the phase change, by averaging pilots in each tile by the averaging unit.

BRIEF DESCRIPTION OF THE DRAWINGS

The foregoing and other objects, features and advantages of the present invention will become more apparent from the following detailed description when taken in conjunction with the accompanying drawings in which:

FIG. 1 is a structure view of a logical signal being transmitted when a Partial Usage of Sub-Channels (PUSC) mode is used in an uplink channel of a communication system supporting Orthogonal Frequency Division Multiplexing (OFDM)/Orthogonal Frequency Division Multiple Access (OFDMA);

FIG. 2 is a structure view of a receiver in the communication system supporting the OFDM/OFDMA using the PUSC mode in the uplink channel;

FIG. 3 is a structure view of a channel estimation apparatus according to an embodiment of the present invention;

FIG. 4 is a structure view of pilots in each tile; and

FIG. 5 is a flowchart illustrating a channel estimation method according to an embodiment of the present invention.

MODE FOR THE INVENTION

Hereinafter, an exemplary embodiment of the present invention will be described in detail with reference to the accompanying drawings. Well known functions and constructions are not described in detail since they would obscure the invention in unnecessary detail.

An apparatus and a method for estimating a channel that will be described herein are applied to a receiver. Since the present invention relates to the channel estimation apparatus and method in a communication system supporting Orthogonal Frequency Division Multiplexing (OFDM)/Orthogonal Frequency Division Multiple Access (OFDMA) that uses a Partial Usage of Sub-Channels (PUSC) mode in an uplink channel, the receiver in the present invention may be a Radio Access Station (RAS) functioning as a base station, for example.

FIG. 1 shows a logical structure of a signal being transmitted when using the PUSC mode in the uplink channel, in the communication system supporting the OFDM/OFDMA. Referring to FIG. 1, one sub-channel comprises 6 tiles, and each tile comprises 4 pilots and 8 data. One sub-channel covers 3 OFDM symbols. The signal is transmitted respectively on different sub-carriers by tile.

The receiver applied to the embodiment of the present invention, as shown in FIG. 2, comprises a Radio Frequency (RF) module 210, a Fast Fourier Transform (FFT) module 220, a derandomizer 230, a depermutation module 240, a channel estimator 250, and a channel compensator 260.

The RF module 210 converts a RF band signal received via antenna to a low-frequency band signal. The FFT module 220 converts a time domain low-frequency band signal to a frequency domain signal. The derandomizer 230 offsets a random number included the signal being transmitted by a transmitter, by multiplying the same random number by the frequency-domain signal converted by the FFT module 220. The depermutation module 240 collects, by the sub-channel, the tiles transmitted on the respectively different sub-carriers. The signal collected by the sub-channel is input to the channel estimator 250. An estimated value in the channel estimator 250 is input to the channel compensator 260 to compensate the channel. The channel estimator 250 among the above components will be described in greater detail with regard to the present invention.

The signal input to the channel estimator is processed by the sub-channel. As shown in FIG. 1, since the tiles constituting the sub-channel are transmitted on the respectively different sub-carriers, each sub-carrier changes in phase due to time delay. The present invention features an apparatus and a method for estimating such change of phase.

The apparatus according to the embodiment of the present invention is divided into two parts; one for estimating and compensating the phase change of the channel using the pilots included in the signal input by the sub-channel, and the other for estimating the channel by averaging the pilots of the signal in which the phase is compensated.

For this, the channel estimation apparatus according to the embodiment of the present invention comprises a phase estimation/compensation unit 310 and a channel estimation unit 320. The phase estimation/compensation unit 310 estimates and compensates the phase change of the channel using the pilots included in the signal input by the sub-channel. The channel estimation unit averages the pilots in which the phase is compensated, thereby estimating the channel. The channel estimation apparatus performs the channel estimation in the communication system supporting the OFDM/OFDMA using the PUSC mode in the uplink channel.

More specifically, the phase estimation/compensation unit 310 comprises a pilot extraction unit 312 that extracts the pilots from the signal input by the sub-channel, a phase change estimation unit 314 that estimates the phase change of the channel using the pilots extracted by the pilot extraction unit 312, and a phase compensation unit 316 that compensates the phase by tile with respect to the pilots extracted by the pilot extraction unit 312 based on the phase change estimated by the phase change estimation unit 314. The channel estimation unit 320 comprises an averaging unit 322 that averages the pilots of the signal phase-compensated by the phase compensation unit 316, and a phase reflection unit 324 that estimates the channel for data compensations using the average value obtained from the averaging unit 322 and the phase change estimated by the phase change estimation unit 314.

The pilot extraction unit 312 extracts the pilots from the signals input to the channel estimation apparatus by the sub-channel. Therefore, the pilot extraction unit 312 extracts four pilots from each of 6 tiles included in one sub-channel. When the pilots of each tile are structured as shown in FIG. 4, output signals of the pilot extraction unit 312 can be expressed as a set $\{P_{i,1}, P_{i,2}, P_{i,3}, P_{i,4}\}$, wherein i=0, 1, . . . , 5. Here, 'i' refers to an index of the tiles constituting one sub-channel.

The phase change estimation unit 314 estimates the phase change by the sub-channel. The phase change can be generated in the signals of the frequency domain, according to position of performing FFT with the received signals, as shown in [Equation 1] as follows:

$$r(n) = s(n) \times \exp(jn\theta), n=0, \ldots, 1023 \quad \text{[Equation 1]}$$

wherein, r(n) refers to a signal including an error due to the position after performing the FFT, s(n) refers to a signal after performing the FFT at a correct position, 'θ' refers to a phase value generated by the FFT position, and 'n' refers to an index of the sub-carrier. In other word, 'θ' refers to a phase difference between neighboring sub-carriers.

According to [Equation 1], the phase is increased as the sub-carrier index increases. The phase change estimation unit 314 thus estimates 'θ' that causes the phase change to the sub-carrier by using the pilots extracted by the sub-channel by the pilot extraction unit 312.

For this purpose, the phase change estimation unit 314 conjugation-multiplies two pilots constituting the same symbol among the four pilots in each tile constituting the sub-channel, by a pilot distanced by 3 sub-carriers, respectively. Then, arctan value is obtained by adding the values conjugation-multiplied by the tile, for one sub-carrier. Next, the phase is obtained by dividing the arctan value by 3 which corresponds to difference of sub-carrier position between the two pilots. This can be expressed by [Equation 2] as follows:

$$\theta = \frac{1}{3} \arctan\left( \sum_{i=0}^{5} (P_{i,1} \times P_{i,3}^* + P_{i,2} \times P_{i,4}^*) \right) \quad \text{[Equation 2]}$$

wherein, $P_{i,1}$, $P_{i,2}$, $P_{i,3}$, and $P_{i,4}$ refer to the four pilots included in one tile as shown in FIG. 4, and 'i' (i=0, 1, . . . , 5) refers to the index of the tiles constituting the one sub-channel.

The phase compensation unit 316 performs phase compensation by the tile with respect to the pilots extracted by the pilot extraction unit 312, using the phase 'θ' estimated by the phase change estimation unit 314.

The averaging unit 322 sums the phase-compensated pilots by the tile and averages the sum, thereby calculating $P_i$. Here, 'i' (i=0, 1, . . . , 5) refers to the index of the tiles constituting the one sub-channel. More specifically, the output of the averaging unit 322 can be expressed by [Equation 3] as follows:

$$P_i = \frac{P_{i,1} + P_{i,3} \times \exp(-j3\theta) + P_{i,2} + P_{i,4} \times \exp(-j3\theta)}{4} \quad \text{[Equation 3]}$$

As described above, in order to compensate the channel in the data by using $P_i$ calculated by the averaging unit 322 and representing each tile, the phase in the data needs to be reflected to $P_i$. This is performed by the phase reflection unit 324.

The phase reflection unit 324 estimates the channel for data compensation by using the representative value $P_i$ of each tile and obtained by the sub-channel by the phase change estimation unit 320. To this end, the phase reflection unit 324 transmits four values $P_i \times \{1, e^{j\theta}, e^{j2\theta}, e^{j3\theta}\}$ per tile, to the channel compensator 250 of FIG. 2. The four values are obtained by multiplying the signals of a first sub-carrier 410 by $P_i$, the signals of a second sub-carrier 420 by $P_i \times \exp j\theta$, the signals of a third sub-carrier 430 by $P_i \times \exp(j2\theta)$, the signals of a fourth sub-carrier 440 by $P_i \times \exp(j3\theta)$, with respect to each tile structured as shown in FIG. 4. Here, 'i' (i=0, 1, . . . , 5) refers to the index of tiles constituting the one sub-channel. The channel compensation unit 260 uses the four values according to the sub-carrier positions of the data in each tile, to compensate the channel.

In the same manner as the channel estimation apparatus described above, a channel estimation method according to an embodiment of the present invention mainly comprises steps of estimating and compensating the phase change of the channel by using the pilots included in the signal input by the sub-channel, and estimating the channel by averaging the phase-compensated signal.

FIG. 5 is a flowchart illustrating the channel estimation method according to the embodiment of the present invention. The method will now be explained in greater detail with reference to the component parts of FIG. 3.

When the pilot extraction unit 312 extracts the pilots from each tile constituting the sub-channel in the signal input by the sub-channel (S510), the phase change estimation unit 314 estimates the phase by the sub-channel, using the extracted pilots (S520). The phase compensation unit 316 compensates the phase of the extracted pilots by using the estimated phase (step S530).

When the phase of the pilots is compensated (S530), the averaging unit 322 calculates the representative values of the respective tiles, by summing the phase-compensated pilots by the tile and averaging the sum (S540). The channel for data compensation is estimated using the representative values calculated in the step S540 and the phase estimated in the step S520 (S550).

Since the rest process has been already explained regarding FIG. 3, detailed description will be omitted.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

The invention claimed is:

1. An apparatus for estimating a channel in a communication system supporting Orthogonal Frequency Division Multiplexing/Orthogonal Frequency Division Multiple Access (OFDM/OFDMA), the apparatus comprising:
   a phase estimation/compensation unit configured to estimate and compensate phase change of a channel by using pilots included in a Partial Usage of Sub-Channels (PUSC) mode signal input by a sub-channel; and a channel estimation unit configured to estimate the channel by using the pilots of the PUSC mode signal of which the phase is compensated.

2. The apparatus of claim 1, wherein the phase estimation/compensation unit comprises:

a pilot extraction unit configured to extract the pilots from each tile constituting the sub-channel in the PUSC mode signal input by the sub-channel;

a phase change estimation unit configured to estimate the phase change by the sub-channel by using the extracted pilots; and a phase compensation unit configured to compensate the phase of the extracted pilots by using the estimated phase change.

3. The apparatus of claim 1, wherein the channel estimation unit comprises:

an averaging unit configured to calculate representative values of the respective tiles by summing the phase-compensated pilots by the tile and averaging the sum; and a phase reflection unit configured to estimate the channel for data compensation by using the representative values of the respective tiles and the phase change.

4. The apparatus of claim 2, wherein the phase change estimation unit is configured to estimate the phase change by conjugation-multiplying two pilots constituting the same symbol among the pilots in each tile by a pilot distanced by a predetermined number of sub-carriers, respectively, obtaining an arctan value by adding the values conjugation-multiplied by the tile, for one sub-channel, and dividing the arctan value by a value corresponding to a difference of sub-carrier position between the two pilots.

5. A computer-implemented method for estimating a channel in a communication system supporting OFDM/OFDMA, the computer-implemented method comprising:

estimating and compensating, using a computer processor, phase change of the channel by using pilots included in a Partial Usage of Sub-Channels (PUSC) mode signal input by a sub-channel; and estimating, using a computer processor, the channel by using the pilots of the PUSC mode signal of which the phase change is compensated.

6. The computer-implemented method of claim 5, wherein the estimating and compensating of the phase change comprises:

extracting, using a computer processor, the pilots from each tile constituting the sub-channel in the PUSC mode signal input by the sub-channel;

estimating, using a computer processor, the phase change by the sub-channel by using the extracted pilots; and compensating, using a computer processor, the phase of the extracted pilots by using the phase change.

7. The computer-implemented method of claim 5, wherein the estimating of the channel comprises:

calculating, using a computer processor, representative values of the respective tiles by summing the phase-compensated pilots by the tile and averaging the sum; and estimating, using a computer processor, the channel for data compensation by using the representative values of the respective tiles and the phase change.

8. The computer-implemented method of claim 7, wherein the phase change is estimated by conjugation-multiplying two pilots constituting the same symbol among the pilots in each tile by a pilot distanced by a predetermined number of sub-carriers, respectively, obtaining an arctan value by adding the values conjugation-multiplied by the tile, for one sub-channel, and dividing the arctan value by a value corresponding to a difference of sub-carrier position between the two pilots.

9. An apparatus for estimating a channel in a communication system supporting OFDM/OFDMA, comprising:

a Radio Frequency (RF) module configured to convert an RF band Partial Usage of Sub-Channels (PUSC) mode signal received from a terminal via an antenna to a low-frequency band signal;

a Fast Fourier Transform (FFT) module configured to convert the low-frequency band signal to a frequency-domain signal;

a derandomizer configured to offset a random number included in the PUSC mode signal being transmitted by the terminal, with respect to the frequency-domain signal;

a depermutation module configured to depermutate and output the frequency-domain signal in which the random number is offset, by the sub-channel;

a channel estimator configured to estimate and compensate phase change of the channel by using pilots included in the frequency-domain signal by the sub-channel, and estimate the channel by using the phase-compensated signal.

10. The apparatus of claim 9, wherein the channel estimator comprises:

a pilot extraction unit for extracting the pilots from each tile constituting the sub-channel in the signal input by the sub-channel;

a phase change estimation unit for estimating the phase change by the sub-channel by using the extracted pilots;

a phase compensation unit for compensating the phase of the extracted pilots by using the estimated phase change;

an averaging unit for calculating representative values of the respective tiles by summing the phase-compensated pilots by the tile and averaging the sum; and a phase reflection unit for estimating the channel for data compensation by using the representative values of the respective tiles and the phase change.

11. The apparatus of claim 10, wherein the phase change estimation unit is configured to estimate the phase change by conjugation-multiplying two pilots constituting the same symbol among the pilots in each tile by a pilot distanced by a predetermined number of sub-carriers, respectively, obtaining an arctan value by adding the values conjugation-multiplied by the tile, for one sub-channel, and dividing the arctan value by a value corresponding to a difference of sub-carrier position between the two pilots.

12. The apparatus of claim 10, wherein the channel estimator estimates the channel by reflecting the phase change to the representative values of the respective tiles, according to positions of the sub-carriers constituting each tile.

13. A computer-implemented method for estimating a channel in a communication system supporting OFDM/OFDMA, the computer-implemented method comprising:

converting, using a computer processor, an RF band Partial Usage of Sub-Channels (PUSC) mode signal received from a terminal via an antenna to a low-frequency band signal;

converting, using a computer processor, the low-frequency band signal to a frequency-domain signal;

offsetting, using a computer processor, a random number included the PUSC mode signal being transmitted by the terminal, with respect to the frequency-domain signal;

combining, using a computer processor, the frequency-domain signal in which the random number is offset, by the sub-channel; and estimating and compensating, using a computer processor, phase change of the channel by using pilots included in the frequency-domain signal by the sub-channel, and estimating the channel by using the phase-compensated signals.

14. The computer-implemented method of claim 13, wherein the estimating of the channel comprises:

extracting, using a computer processor, the pilots from each tile constituting the sub-channel in the signals input by the sub-channel;

estimating, using a computer processor, the phase change by the sub-channel by using the extracted pilots;

compensating, using a computer processor, the phase of the extracted pilots by using the phase change;

calculating, using computer processor, representative values of the respective tiles by summing the phase-compensated pilots by the tile and averaging the sum; and estimating, using a computer processor, the channel for data compensation by using the representative values of the respective tiles and the phase change.

15. The computer-implemented method of claim 14, wherein the phase change is estimated by conjugation-multiplying two pilots constituting the same symbol among the pilots in each tile by a pilot distanced by a predetermined number of sub-carriers, respectively, obtaining an arctan value by adding the values conjugation-multiplied by the tile, for one sub-channel, and dividing the arctan value by a value corresponding to a difference of sub-carrier position between the two pilots.

16. The computer-implemented method of claim 14, wherein the channel is estimated by reflecting the phase change to the representative values of the respective tiles, according to positions of the sub-carriers constituting each tile.

* * * * *